ated Apr. 9, 1974

3,803,102
COPOLYAMIDES FROM m- AND p-XYLYLENE DIAMINES AND AN ALIPHATIC DIBASIC ACID MIXTURE

Alfred Case Whiton, Blue Bell, Pa., assignor to Pennwalt Corporation, Philadelphia, Pa.
No Drawing. Filed Aug. 21, 1972, Ser. No. 282,501
Int. Cl. C08g 20/20
U.S. Cl. 260—78 R  3 Claims

ABSTRACT OF THE DISCLOSURE

Random copolyamides of (i) mixtures of meta- and para-xylylenediamines wherein the meta- form constitutes at least 50 mole percent by weight with (ii) a long chain dibasic acid containing 9 to 12 carbon atoms are useful as engineering plastics; mixtures of the acids may be used in any proportion and dimer acid may be present up to 20 mole percentage of the acid constituent; as much as 20 mole percent of either or both xylylenediamine may be replaced by piperazine.

BACKGROUND OF THE INVENTION

The ability of xylylenediamine to form polyamides with dibasic acids was recognized in the early Du Pont patents on nylon and nylon production, such as U.S. 2,130,523; 2,130,947; 2,130,948; 2,163,584; 2,163,636; 2,190,770; and 2,193,529. Many other patents have issued where specific xylylenediamines and dibasic acids are suggested or taught as nylon forming materials, e.g. U.S. 2,766,221; 2,773,902; 2,878,235; 2,916,475; 2,916,476; 2,987,506; 2,997,463; 3,053,813; 3,145,133; 3,164,630; 3,200,183 and 3,439,025. No teaching of the highly useful and unexpected properties to be derived from the specific copolyamides of the present invention is known however.

STATEMENT OF THE INVENTION

The present invention provides a random copolyamide of repeating units of —R—Z— and —Y—Z— wherein
—R— is a member of the group (i) metaxylylenediamino and (ii) a mixture of metaxylylenediamine and piperazino wherein metaxylylenediamino constitutes at least 80 mol percentage.
—Y— is a member of the group of (i) paraxylylenediamino and (ii) a mixture of paraxylylenediamino and piperazino wherein paraxylylenediamino constitutes at least 80 mol percentage,
—Z— is a member of the group of (i)

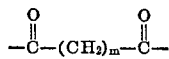

and (ii) a mixture

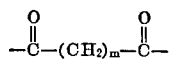

and the dicarbonyl radical of dimer acid wherein

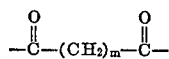

constitutes at least 80 mole percentage.

$m$ is a number from 7 to 10 inclusive, the said copolyamide containing from 50 mol percentage to 80 mol percentage of —R—Z— as a repeating unit, the remainder being —Y—Z—.

The copolyamide of this invention is of a sufficiently crystalline nature and possesses a balance of properties, e.g. high modulus (for toughness), good tensile strength combined with moderate elongation (for strength and resistance to impact), low water absorption (for dimensional stability), and good thermal stability (for long life), to make it particularly useful as an engineering plastic. It is conveniently prepared by conventional melt polymerization; in this process to obtain high molecular weight polymer from the dibasic acid-diamine salt, the reaction is carried out in two distinct stages, a "prepolymer" preparation step and a finishing step. In the first step (preparing the "prepolymer") the dibasic acid-diamine salt is heated slightly above its melting point for several hours in a closed vessel, to assure converting all the diamine contained in the salt into a low molecular weight polyamide (so it cannot be lost in this and subsequent operations). The finishing step consists of maintaining the molten "prepolymer" at an even higher temperature (260° C. or higher) for a few hours, frst at at atmospheric pressure (under nitrogen) and then under high vacuum. The purpose of the final stage is to remove from the system all the water formed in the condensation of —NH₂ and —COOH groups to form —CONH— linkages, which aids in driving the reaction to completion (to high molecular weight polymer).

THE EXAMPLES

The following examples are cited to illustrate the invention; they are not intended to limit in any manner. In each example using the mixed xylylenediamines (i.e. "XDS"), the mixture is one of 70 mole percentage metaxylylenediamine and 30 mol percentage of paraxylylenediamine. Dibasic acids which are straight chain and unsubstituted, are identified by a numeral corresponding to the number of carbon atoms contained in the molecule. Piperazine, where present, is abbreviate "Pip" and "D" is used to indicate "dimer acid". The properties reported in the examples and designated $T_y$, $T_B$, $E_B$, and tensile modulus are all measured by standard ASTM methods using microtensile specimens. These properties may be defined as follows:

(a) $T_y$, or yield tensile, is the stress at which the specimen exhibits permanent deformation; it is a practical approximation of the elastic limit of the material.

(b) $T_B$, or tensile at break, is the ultimate strength of the material subjected to tensile loading; it is usually the maximum stress developed in the material in a tension test. Stress is the load on the specimen divided by the area through which it acts.

(c) $E_B$, or elongation at break, is a measure of ductility of the material determined in a tension test. It is the increase in length of the specimen (measured after rupture) divided by the original length of the specimen. Elongation is usually reported as a percent figure.

(d) Tensile modulus, included in Table II of Example 2, is a modulus of elasticity in tension (or Young's Modulus) of the specimen, and is an indication of the extent to which the material absorbs energy without permanent deformation. Toughness as used in Table I of Example 1 is the numerical product of $T_B$ times $E_B$ (or area beneath the stress-strain curve of the specimen in a tension test). This value denotes toughness of the material since it represents "work-to-break" or ability of the material to absorb energy before fracture. Thus toughness in Table I is a work-to-break value, and tensile modulus in Table II is as stated above.

Example 1

Two 30 x 220 mm. cylindrical Pyrex glass tubes, fitted on their open ends with a precision ground high vacuum stocpcock, are each charged with 10.0 g. of pure, dry XDS/10 salt (previously prepared by mixing exactly equivalent amounts of sebacic acid and a blend of 70 mole percent metaxylylenediamine and 30 mole percent paraxylylenediamine; both the sebacic acid the diamine are dissolved in a minimum amount of absolute ethanol before mixing). The tubes are evacuated and purged several times with nitrogen, finally are evacuated to approximately 0.1–0.2 mm. and the stopcocks closed. The sealed tubes are then immersed in a bath of boiling liquid at 220° C. and held for five hours at this temperature. The tubes are removed from the 220° C. bath after this length of time and the molten mass ("prepolymer") allowed to solidify.

Prepolymer is removed from the two tubes used in the first stage of the polymerization by breaking the tubes, the material is crushed into coarse granules and placed in a single 30 x 220 mm. cylindrical Pyrex glass tube fitted on its open end with a straight section of 12 mm. tubing. A sidearm is welded to the straight section of tubing (for attachment to a vacuum pump) and a fine capillary is fitted into the top of the polymer tube (for bubbling nitrogen into the molten polymer). In this tube the "prepolymer" is remelted under nitrogen (in a liquid bath boiling at 200° C.) and held at this stage for about one hour with nitrogen passing through the melt; during this time a quantity of water is driven from the molten mass. Finally vacuum is applied to the tube and its contents, the mass is heated for about one hour at 220° C. and 0.1 mm., then for three hours at 260° C. and 0.1 mm. By this time the polymer has reached high molecular weight (evidenced by high viscosity of the molten mass), and is allowed to cool and solidify in the tube under nitrogen. The tube is broken away from the solid polymer, and the sample (approximately 16.5 g.) is made ready for physical and mechanical tests.

The melt polymerization procedure described above is used to prepare high molecular weight polyamides of (a) XDS/10 (i.e. the mixed xylylenediamines and sebacic acid), (b) MXD/10 (i.e. metaxylylenediamine and sebacic acid) and (c) PXD/10 (i.e. paraxylylenediamine and sebacic acid). Properties of the resulting polymers are reported in Table I.

TABLE I

| Resin | $\eta$ inh (dl./g.) | $T_B$ (p.s.i.) | $E_B$, percent | Toughness (p.s.i.) | M.P. (° C.) |
|---|---|---|---|---|---|
| XDS/10 | 2.004 | 10,680 | 280 | $2.99 \times 10^6$ | 210 |
| MXD/10 | 2.118 | 7,340 | 230 | $1.69 \times 10^6$ | 185 |
| PXD/10 | 1.304 | 6,940 | 120 | $0.83 \times 10^6$ | 235 |

From the above it will be noted that tensile strength, elongation and toughness of the XDS/10 sample, instead of being between the corresponding values of the MXD/10 and P5D/10 are higher in each instance. Furthermore, the PXD/10 sample tends to decompose when molded and can not be extruded through a Sieglaff-McKelvey rheometer. The MXD/10 sample shows poor load bearing properties at high temperatures in a thermal mechanical analyzer. The XDS/10 copolyamide of the present invention molds readily, is extrudable through the Sieglaff-McKelvey rheometer and registered good load bearing properties at high temperature on a thermal mechanical analyzer.

A series of random copolyamides prepared from the same XDS mixture used above with acids and acid mixtures is prepared following the conventional melt-polymerization technique. The identity of the polymers and measured properties are reported in Table II. Where a mixture of components (in addition to XDS) is employed, the mol proportion of the constituents of the mixed component appears in parenthesis under the identity of the component.

TABLE II

| Example number | Resin | $T_Y$ (p.s.i.) | $T_B$ (p.s.i.) | $E_B$ percent | Tensile modulus (p.s.i.) | $\eta$ inh (dl./g.) | Water abs., percent | Cryst· M.P. (° C.) |
|---|---|---|---|---|---|---|---|---|
| 2 | XDS/10 | 10,540 | 8,570 | 130 | $3.1 \times 10^5$ | 1.54 | 1.09 | 210 |
| 3 | XDS/12 | 10,300 | 8,400 | 130 | $2.8 \times 10^5$ | 1.24 | 1.05 | 207 |
| 4 | XDS/12+9 (3:1) | 8,720 | 6,950 | 180 | $2.7 \times 10^5$ | 1.23 | 2.47 | 189 |
| 5 | XDS/12+9 (1:1) | 9,180 | 8,720 | 330 | $2.4 \times 10^5$ | 0.96 | 3.00 | 174 |
| 6 | XDS/12+D (9:1) | 8,490 | 8,450 | 210 | $2.7 \times 10^5$ | 1.24 | 1.08 | 200 |
| 7 | XDS/12+D (4:1) | 6,410 | 6,200 | 130 | $1.9 \times 10^5$ | 1.38 | 0.86 | 187 |
| 8 | XDS+Pip/12 (9:1) | 8,760 | 7,610 | 110 | $2.8 \times 10^5$ | 1.50 | 1.29 | 193 |
| 9 | XDS+Pip/12 (4:1) | 6,660 | 9,270 | 290 | $2.2 \times 10^5$ | 1.52 | 1.76 | 182 |
| 10 | XDS+Pip/12+9 (9:1) (9:1) | 8,580 | 8,450 | 180 | $2.7 \times 10^5$ | 1.72 | 1.39 | 186 |
| 11 | XDS+Pip/12+9 (4:1) (4:1) | 7,570 | 8,920 | 240 | $2.4 \times 10^5$ | 1.73 | 3.20 | 170 |

THE REACTANTS

The xylylenediamines useful in preparing the copolyamides of the present invention may be substituted in the aromatic ring by non-amide forming groups such as lower alkyl, halide, nitro and the like. The piperazine, when used, may be similarly substituted.

The acid moiety used to prepare the copolyamide of the present invention may be any of decanedioic acid, undecanedioic acid, dodecanedioic acid, mixtures thereof and mixtures with dimer acid, the dimer acid when present constituting no more than 20 mol percentage of acids employed.

Many equivalent modifications of the present invention will be apparent to those skilled in the art without a departure from the inventive concept.

What is claimed is:

1. A tough, high molecular weight random copolyamide of repeating units of 70 mol percentage of —R—Z— and 30 mol percentage of —Y—Z— wherein —R— is metaxylylenediamino, —Y— is paraxylylenediamino and —Z— is a mixture of (a) the radical

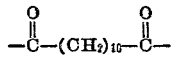

and (b) the radical

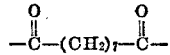

(a) constituting at least 50 mol percentage of said mixture.

2. The copolyamide of claim 1 wherein radical (a) constitutes 50 mol precentage of said mixture.

3. The copolyamide of claim 1 wherein radical (a) constitutes 75 mol percentage of said mixture.

References Cited

UNITED STATES PATENTS

| | | | |
|---|---|---|---|
| 2,987,506 | 6/1961 | Lum | 260—78 |
| 3,164,630 | 1/1965 | Pietrusza | 260—78 R |
| 3,649,602 | 3/1972 | Tsuda | 260—78 R |

FOREIGN PATENTS

| | | | |
|---|---|---|---|
| 45/9,390 | 4/1970 | Japan | 260—18 N |
| 44/22,511 | 9/1969 | Japan | 260—78 R |
| 1,142,439 | 9/1957 | France | 260—78 R |
| 44/20,637 | 9/1969 | Japan | 260—78 R |
| 836,127 | 6/1960 | Great Britain | 260—78 R |
| 573,148 | 3/1959 | Canada | 260—78 R |

DONALD E. CZAJA, Primary Examiner

G. R. MARSHALL, Assistant Examiner

U.S. Cl. X.R.

260—18 N